US010166676B1

(12) United States Patent
Hudson et al.

(10) Patent No.: US 10,166,676 B1
(45) Date of Patent: Jan. 1, 2019

(54) KINESTHETIC TEACHING OF GRASP PARAMETERS FOR GRASPING OF OBJECTS BY A GRASPING END EFFECTOR OF A ROBOT

(71) Applicant: X DEVELOPMENT LLC, Mountain View, CA (US)

(72) Inventors: Nicolas Henry Hudson, San Mateo, CA (US); Crystal Chao, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 179 days.

(21) Appl. No.: 15/177,326

(22) Filed: Jun. 8, 2016

(51) Int. Cl.
*B25J 9/16* (2006.01)
*B25J 13/08* (2006.01)

(52) U.S. Cl.
CPC ........... *B25J 9/1661* (2013.01); *B25J 9/1612* (2013.01); *B25J 9/1697* (2013.01); *B25J 13/085* (2013.01); *G05B 2219/39484* (2013.01); *G05B 2219/39532* (2013.01)

(58) Field of Classification Search
CPC ....... B25J 9/163; B25J 9/1664; G05B 19/423; G05B 2219/36442
See application file for complete search history.

(56) References Cited

U.S. PATENT DOCUMENTS

| 8,386,079 B1* | 2/2013 | Kohler | G06K 9/00362 |
| | | | 700/246 |
| 8,843,236 B2* | 9/2014 | Barajas | B25J 9/1664 |
| | | | 700/253 |
| 2008/0255704 A1* | 10/2008 | Braut | B25J 13/02 |
| | | | 700/264 |
| 2015/0336268 A1* | 11/2015 | Payton | B25J 9/163 |
| | | | 700/261 |

OTHER PUBLICATIONS

Herzog, Alexander, Peter Pastor, Mrinal Kalakrishnan, Ludovic Righetti, Tamim Asfour, and Stefan Schaal. "Template-based learning of grasp selection." In Robotics and Automation (ICRA), 2012 IEEE International Conference on, pp. 2379-2384. IEEE, 2012 Jan. 1, 2012.

(Continued)

*Primary Examiner* — Adam R Mott
(74) *Attorney, Agent, or Firm* — Middleton Reutlinger

(57) ABSTRACT

Some implementations are directed to methods and apparatus for determining, based on sensor data generated during physical manipulation of a robot by a user, one or more grasp parameters to associate with an object model. Some implementations are directed to methods and apparatus for determining control commands to provide to actuator(s) of a robot to attempt a grasp of an object, where those control commands are determined based on grasp parameters associated with an object model that conforms to the object. The grasp parameter(s) associated with an object model may include end effector pose(s) that each define a pose of a grasping end effector relative to the object model and/or translational force measure(s) that each indicate force applied to an object by a grasping end effector, where the force is at least partially the result of translation of an entirety of the grasping end effector.

19 Claims, 9 Drawing Sheets

(56) References Cited

OTHER PUBLICATIONS

Kormushev, Petar, Sylvain Calinon, and Darwin G. Caldwell. "Imitation learning of positional and force skills demonstrated via kinesthetic teaching and haptic input." Advanced Robotics 25, No. 5 (2011): 581-603 Jan. 1, 2011.

Leeper, Adam Eric, Kaijen Hsiao, Matei Ciocarlie, Leila Takayama, and David Gossow. "Strategies for human-in-the-loop robotic grasping." In Proceedings of the seventh annual ACM/IEEE international conference on Human-Robot Interaction, pp. 1-8. ACM, 2012 Jan. 1, 2012.

* cited by examiner

KINESTHETIC TEACHING OF GRASP PARAMETERS FOR GRASPING OF OBJECTS BY A GRASPING END EFFECTOR OF A ROBOT

BACKGROUND

Many robots are programmed to utilize one or more end effectors to grasp objects. For example, a robot may utilize a grasping end effector such as an "impactive" grasping end effector or "ingressive" grasping end effector (e.g., physically penetrating an object using pins, needles, etc.) to pick up an object from a first location, move the object to a second location, and drop off the object at the second location. Some additional examples of robot end effectors that may grasp objects include "astrictive" grasping end effectors (e.g., using suction or vacuum to pick up an object) and one or more "contigutive" grasping end effectors (e.g., using surface tension, freezing, or adhesive to pick up an object), to name just a few.

While humans innately know how to correctly grasp many different objects, determining an appropriate manner to grasp an object for manipulation of that object may be a difficult task for robots. Despite the difficulty, various approaches have been proposed in which robots can grasp various objects. However, many of those approaches may suffer from one or more drawbacks, such as not leveraging one or more grasp parameters determined through physical manipulation(s) of robot(s) by user(s), not utilizing grasp parameters associated with an object model of an object to be grasped, not taking certain force grasp parameters into account in grasping an object, etc. Additional and/or alternative drawbacks of these and/or other approaches may be presented.

SUMMARY

Some implementations of this specification are directed to methods and apparatus for determining, based on sensor data generated during physical manipulation of a robot by a user, one or more grasp parameters to associate with an object model, such as an object model that is specific to a particular physical object and/or that is applicable to multiple physical objects. Some implementations are additionally and/or alternatively directed to methods and apparatus for determining control commands to provide to actuator(s) of a robot to attempt a grasp of an object, where those control commands are determined based on grasp parameters associated with an object model that conforms to the object.

In many implementations, the grasp parameter(s) include end effector pose(s) and/or translational force measure(s). Each of the end effector poses may define a full six-dimensional pose, of a grasping end effector, where the pose is associated with an attempted grasp of an object. For example, the end effector poses may include: a pre-grasp pose of the grasping end effector prior to (e.g., immediately prior to) an attempted grasp utilizing the grasping end effector; a sequence of poses of the grasping end effector that collectively define all or portions of a path, of the grasping end effector, associated with an attempted grasp; etc. Each of the translational force measures may indicate force applied to an object by a grasping end effector during at least part of an attempted grasp of the object by the grasping end effector—where the force applied to the object is at least partially the result of translation of an entirety of the grasping end effector (e.g., a result of movement of one or more actuators that are "upstream" of the end effector and whose positions influence the pose of the entirety of the end effector). In other words, the translational force measures are based at least in part on movement of the robot that is independent of movement of any actuable members of the grasping end effector itself.

In some implementations, a method is provided that includes identifying an object model for an object in an environment of a robot and determining an object model pose of the object model that conforms to an object pose of the object in the environment. The method further includes identifying sensor data generated by one or more sensors of the robot during physical manipulation of the robot. The physical manipulation is by a human user to cause a grasping end effector of the robot to perform at least part of a grasp sequence for grasping of the object in the environment. The method further includes determining, based on the sensor data and the object model pose, one or more end effector poses of the grasping end effector. Each of the end effector poses defines a pose of the grasping end effector relative to the object model during the grasp sequence. The method further includes determining, based on the sensor data, at least one translational force measure. The translational force measure indicates force applied by the robot to the object during at least some of the grasp sequence, where the force is a result of translation of an entirety of the grasping end effector. The method further includes storing, in one or more computer readable media, an association of the object model to the end effector poses and the translational force measure.

This method and other implementations of technology disclosed herein may each optionally include one or more of the following features.

In some implementations, the end effector poses of the grasping end effector comprise at least a pre-grasp pose. In some versions of those implementations, the method further includes: receiving, at a first time, user interface input provided by the user to one or more user interface input devices associated with the robot; identifying, in response to receiving the user interface input at the first time, a pre-grasp pose group of the sensor data generated at or near the first time; and determining the pre-grasp pose based on the pre-grasp pose group of the sensor data. In some versions of those implementations, the end effector poses of the grasping end effector further include at least one additional end effector pose determined based on an additional group of the sensor data generated after the first time. In some versions of those implementations, the sensor data includes sensor data indicating position values for a plurality of actuators of the robot that dictate positioning of the grasping end effector and determining the pre-grasp pose includes: applying the position values at a given time to a forward kinematic model of the robot to generate a first pose of the grasping end effector at the given time; and converting the first pose to the pre-grasp pose based on the object model pose.

In some implementations, the sensor data includes sensor data indicating: position values for a plurality of actuators of the robot that dictate positioning of the grasping end effector, and at least one force value from a force torque sensor of the robot. In some of those implementations, determining the end effector poses is based on the position values and determining the translational force measure is based on the force value.

In some implementations, the sensor data includes sensor data from at least one force torque sensor of the robot indicating a plurality of force values, and determining the translational force measure includes determining the translational force measure based on a function of the plurality of force values.

In some implementations, the sensor data includes sensor data from at least one force torque sensor of the robot indicating at least one force value, and determining the translational force measure includes determining the translational force measure based on the force value. The force torque sensor may be responsive to force imparted by translation of the entirety of the grasping end effector independent of movement of any actuable members of the grasping end effector.

In some implementations, the end effector poses include an ordered group of a plurality of end effector poses.

In some implementations, the method further includes receiving one or more user interface inputs provided by the user to one or more user interface input devices associated with the robot and identifying the sensor data based on conformance of the sensor data to the user interface inputs.

In some implementations, the method further includes, subsequent to storing the association of the object model to the end effector poses and the force measure: identifying vision sensor data generated by at least one vision sensor of an additional robot in an additional environment, the vision sensor having an additional object in its field of view, and the additional robot having an additional grasping end effector; determining that the object model conforms to the additional object and determining an additional object model pose of the object model that conforms to an additional object pose of the additional object in the environment; identifying the end effector poses based on the end effector poses being associated with the object model; determining, based on the additional object model pose and the end effector poses, control commands to provide to one or more actuators of the additional robot to attempt a grasp of the object, the control commands including commands determined to cause the additional grasping end effector to achieve the end effector poses relative to the additional object in the environment; and providing the control commands to the one or more actuators. In some of those implementations, the method further includes identifying the force measure based on the force measure being associated with the object model and determining at least some of the control commands based on the force measure.

In some implementations, a method is provided that includes identifying vision sensor data generated by at least one vision sensor of a robot in an environment. The vision sensor has an object in its field of view, and the robot has a grasping end effector. The method further includes: determining, based on the vision sensor data, an object model that conforms to the object and an object model pose of the object model. The object model pose indicates the object pose of the object in the environment. The method further includes: identifying a stored association of the object model to one or more end effector poses and at least one force measure; and determining, based on the object model pose, the end effector poses, and the at least one force measure: control commands to provide to one or more actuators of the robot to attempt a grasp of the object. The control commands include commands determined to cause the grasping end effector to achieve the end effector poses relative to the object in the environment and to cause the end effector to impart a force that is based on the force measure, where the force is imparted through translation of an entirety of the grasping end effector. The method further includes providing the control commands to the one or more actuators.

This method and other implementations of technology disclosed herein may each optionally include one or more of the following features.

In some implementations, determining the commands to cause the grasping end effector to achieve the end effector poses includes: converting, based on the object model pose, the end effector poses associated with the object model to actuator positions for each of a plurality of actuators that dictate positioning of the grasping end effector; and determining the commands to cause the grasping end effector to achieve the end effector poses based on the actuator positions.

In some implementations, determining the commands to cause the end effector to impart the force that is based on the force measure includes determining the commands so that the force strictly conforms to an indicated force indicated by the force measure.

In some implementations, determining the commands to cause the end effector to impart the force that is based on the force measure includes determining the commands so that the force does not exceed an indicated force indicated by the force measure.

Other implementations may include one or more non-transitory computer readable storage media storing instructions executable by a processor (e.g., a central processing unit (CPU) or graphics processing unit (GPU)) to perform a method such as one or more of the methods described above. Yet another implementation may include a system of one or more computers and/or one or more robots that include one or more processors operable to execute stored instructions to perform a method such as one or more (e.g., all) aspects of one or more of the methods described above.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
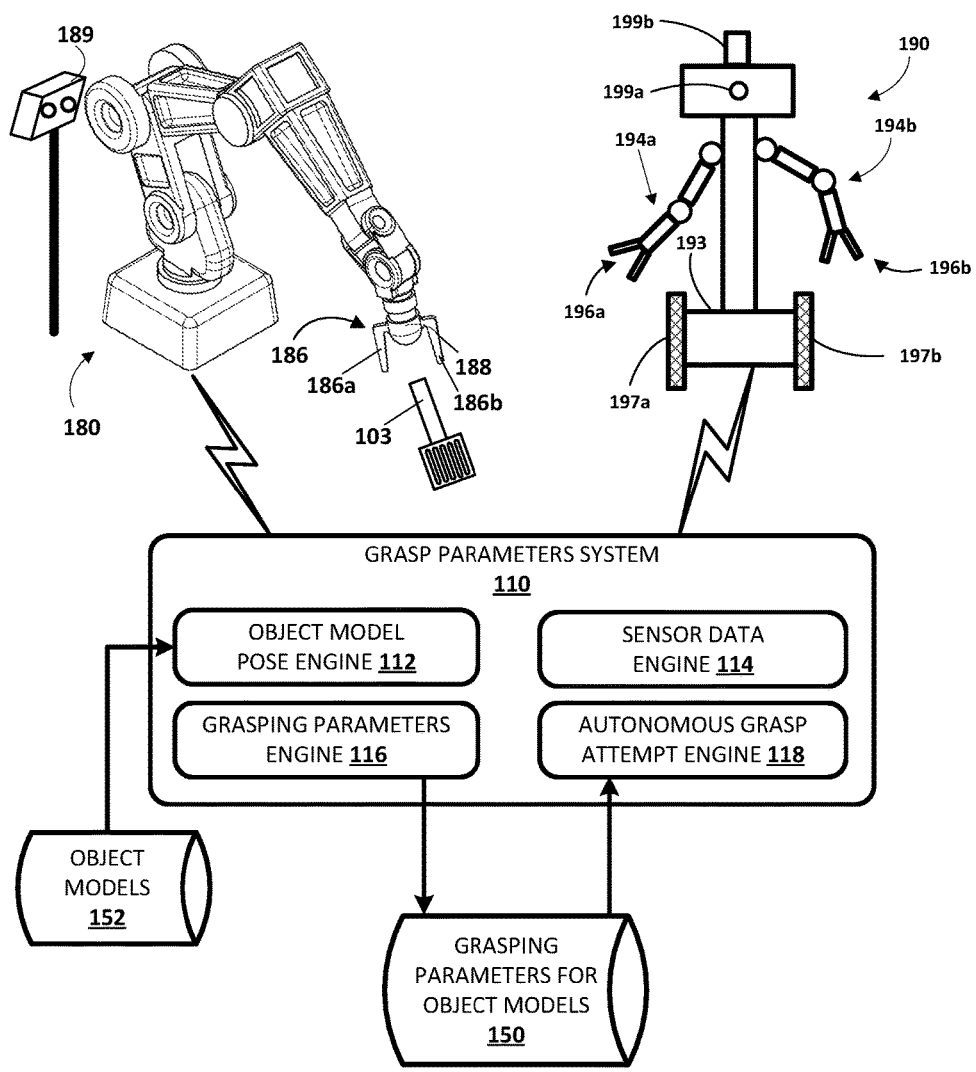
FIG. 1 illustrates an example environment in which grasp parameters may be determined and associated with an object model and/or in which control commands to provide to actuator(s) of a robot to attempt a grasp of an object may be determined based on grasp parameters associated with an object model that conforms to the object.

Some implementations of this specification are directed to methods and apparatus for determining, based on sensor data generated during physical manipulation of a robot by a user, one or more grasp parameters to associate with an object model, such as an object model that is specific to a particular physical object and/or that is applicable to multiple physical objects.

As one example, assume a given object is within a working space of a robot and that the object is in the field of view of a vision sensor (e.g., a stereographic camera, a laser scanner) associated with the robot (e.g., a vision sensor physically coupled to the robot). Vision sensor data (e.g., 3D point cloud data) from the vision sensor may be utilized to determine an object model (e.g., a 3D model) that conforms to the object and to further determine an object model pose of the object model. The object model pose of the object model is an estimate of an object pose of the object in the environment and may be determined utilizing various techniques, such as techniques that determine the object model pose based on a determined "best fit" between 3D point cloud data and the object model.

Continuing with the example, further assume that a user physically manipulates the robot to position a grasping end effector of the robot in a pre-grasp pose relative to the object, then further physically manipulates the robot to move the grasping end effector of the robot through one or more additional poses to cause the grasping end effector to at least partially grasp the object. Sensor data generated by one or more sensors of the robot during the physical manipulation may be utilized to determine various grasp parameters. For example, the sensor data may be utilized to determine one or more end effector poses (e.g., at least a pre-grasp pose) of the grasping end effector during the physical manipulation, where each of the end effector poses defines a pose of the grasping end effector relative to the object model. For instance, the sensors may include one or more position sensors associated with actuators that control the end effector pose, and the positions sensors may generate sensor data that indicate position values. The position values indicated by sensor data for a given time of the physical manipulation may be utilized to determine a pose of the end effector relative to a reference frame (e.g., a robot frame) at the given time, and that pose converted to an end effector pose (that is relative to the object model) based on the determined object model pose.

As another example of sensor data, the sensor data may additionally and/or alternatively be utilized to determine at least one translational force measure indicating translational force applied by the robot to the object during the physical manipulation by the user, where the force applied to the object is at least partially the result of translation of an entirety of the grasping end effector (e.g., a result of movement of one or more actuators that are "upstream" of the end effector and whose positions influence the pose of the entirety of the end effector). For instance, the sensors may include a force torque sensor at a "wrist" of the robot at a connection between the end effector and other components of the robot, and the force torque sensor may generate sensor data indicative of force values. The force values indicated by sensor data for one or more times of the physical manipulation may be utilized to determine the force measure. For example, the force measure may be based on an average of the force values indicated by sensor data at a plurality of times, a maximum force value indicated by the sensor data, and/or based on other function of the force values indicated by the sensor data.

In some implementations, a user may provide user interface input to indicate when sensor data should be utilized to generate one or more grasping parameters. For example, a user may provide spoken user interface input that is sensed by a microphone associated with the robot. For instance, after physically manipulating the end effector to a pre-grasp pose the user may speak "record pre-grasp pose" or another phrase to indicate that sensor data at that time should be utilized to determine a pre-grasp pose. Further, the phrase (or another phrase) may indicate that sensor data indicating force value(s), that occur within a threshold amount of time following that time, should be utilized to determine a translational force measure.

Continuing with the example, an association between the object model and the determined end effector pose(s), the force measure(s), and/or other grasping parameters may be stored. The stored association may then be utilized by one or more robots to determine grasping parameters for one or more later encountered objects that conform to the object model. In some implementations, end effector pose(s) and/or force measure(s) determined from other physical manipulations (of the same robot or different robot(s)) that are associated with grasping the object may also be associated with the object model. In some of those implementations, the end effector pose(s) and/or force measure(s) from multiple physical manipulations may optionally be analyzed to determine one or more "combined end effector poses" and/or "combined force measures". For example, a combined force measure may be based on a mean, average, and/or other statistical function of a plurality of the force measures.

Some implementations are additionally and/or alternatively directed to methods and apparatus for determining control commands to provide to actuator(s) of a robot to attempt a grasp of an object, where those control commands are determined based on grasp parameters associated with an object model that conforms to the object.

As one example, assume a given object is within a working space of a robot and that the object is in the field of view of a vision sensor associated with the robot. Vision sensor data from the vision sensor may be utilized to determine an object model that conforms to the object and to further determine an object model pose of the object model. A stored association of the object model to one or more end effector poses and one or more translational force measures may further be determined. The object model pose, the end effector pose(s), and the translational force measure(s) may be utilized to determine control commands to provide to one or more actuators of the robot to attempt a grasp of the object. The determined control commands include commands determined to cause the grasping end effector to achieve the end effector poses relative to the object in the environment and to cause the end effector to impart a force that is based on the translational force measure and imparted through translation of an entirety of the grasping end effector. The control commands may be provided to the one or more actuators. For example, where a pre-grasp pose and a translational force measure are associated with the object model, control commands can be provided to cause the grasping end effector to be adjusted to the pre-grasp pose, then moved toward the object until a force torque sensor generates sensor data indicating the force indicated by the translational force measure has been achieved (through contact with the object), at which point one or more actuable members of the grasping end effector may be actuated to grasp the object.

Turning now to FIG. 1, an example environment is illustrated in which in which grasp parameters may be determined and associated with an object model and/or in which control commands to provide to actuator(s) of a robot to attempt a grasp of an object may be determined based on grasp parameters associated with an object model that conforms to the object.

Example robots 180 and 190 are illustrated in FIG. 1. Robot 180 is a "robot arm" having multiple degrees of freedom to enable traversal of a grasping end effector 186 of the robot 180 along any of a plurality of potential paths to position the grasping end effector 186 in any one of a plurality of desired poses. As used herein, a pose of an end effector references a full six-dimensional ("6D") pose of the end effector that specifies both a position and an orientation of the end effector. In some implementations, the position of the end effector may be the position of a reference point of the end effector, such as reference point 188. In some implementations, the reference point of an end effector may be a center of mass of the end effector, and/or a point near where end effector attaches to other components of the robot, though this is not required.

The pose of an end effector may be defined in various manners, such as in joint space and/or in Cartesian/configuration space. A joint space pose of an end effector may be a vector of values that define the states of each of the actuators that dictate the position of the end effector. A Cartesian space pose of an end effector may utilize coordinates or other values that define all six degrees of freedom of the end effector relative to a reference frame. It is noted that some robots may have kinematic redundancy and that more than one joint space pose of an end effector may map to the same Cartesian space pose of the end effector in those robots.

Robot 180 further controls two opposed actuable members 186a and 186b of the end effector 186 to actuate the actuable members 186a and 186b between at least an open position and a closed position (and/or optionally a plurality of "partially closed" positions). As described herein, robot 180 may operate autonomously at least part of the time and control actuators thereof to grasp an object based on grasp poses, forces, and/or other grasping parameters that are generated by autonomous grasp attempt engine 118 in view of grasping parameters associated with an object model of the object in grasping parameters for object models database 150. As used herein, an "actuator" of a robot may refer to motors (e.g., servo motors), joints, shafts, gear trains, pumps (e.g., air or liquid), pistons, drives, and/or other components that may create and/or undergo propulsion, rotation, and/or motion. Some actuators may be independently controllable, although this is not required. In some instances, the more operational components robot 180 has, the more degrees of freedom of movement it may have.

As also described herein, the robot 180 may also be physically manipulated by a human user to "kinesthetically teach" grasping parameters to associate with an object model in the grasping parameters for object models database 150. In some implementations the robot 180 may set the mechanical impedance of one or more of its operational components, during one or more periods of time, such that physical manipulation by a user will cause one or more of the components to traverse to a plurality of poses. As one example, the end effector 186 may be physically manipulated by a user to a plurality of unique poses in response to a user physically "grabbing", or otherwise contacting, one or more components of robot 180 and applying force. For instance, the robot 180 may be in a low mechanical impedance, "gravity-compensated" mode during all or portions of physical manipulations of the robot 180 by a user to make it relatively easy for the user to manipulate those operational components. In some implementations, the amount of mechanical impedance may optionally vary based on stored preferences, user interface input provided by the user, and/or based on the current pose of one or more operational components. For instance, the mechanical impedance may vary to provide haptic feedback to the user when the user is approaching limits of one or more operational components, such as positional operational limits.

A vision sensor that is a stereographic camera 189 is also illustrated in FIG. 1 in combination with the robot 180. In some implementations, a stereographic camera includes two or more sensors (e.g., charge-coupled devices (CCDs)), each at a different vantage point and each generating vision sensor data. Each of the two sensors generates vision sensor data and the vision sensor data from each sensor at a given instance may be utilized to generate a two-dimensional ("2D") image at the given instance. Moreover, based on vision sensor data generated by the two sensors, three-dimensional ("3D") point cloud data may also be generated, where each of the 3D points of the 3D point cloud defines a 3D coordinate of a surface of a corresponding object. For example, a 3D point may be determined to be the intersection point of a first ray from a first pixel of a first image generated by one of the sensors at a given instance and a second ray from a corresponding second pixel of a second image generated by the other sensor at or near the given instance (where the rays "project" from the images based on "known" geometries between the images (e.g., the known baseline and angles between the two sensors)). In some other implementations, a stereographic camera may include only a single sensor and one or more mirrors utilized to effectively capture image data from two different vantage points.

In FIG. 1, stereographic camera 189 is mounted at a fixed pose relative to the base or other stationary reference point of robot 180. The stereographic camera 189 has a field of view of at least a portion of the workspace of the robot 180, such as the portion of the workspace that is near grasping end effector 186. Although a particular mounting of stereographic camera 189 is illustrated in FIG. 1, additional and/or alternative mountings may be utilized. For example, in some implementations, stereographic camera 189 may be mounted directly to robot 180, such as on a non-actuable component of the robot 180 or on an actuable component of the robot 180 (e.g., on the end effector 186 or on a component close to the end effector 186). Also, for example, in some implementations, the stereographic camera 189 may be mounted on a non-stationary structure that is separate from the robot 180 and/or may be mounted in a non-stationary manner on a structure that is separate from robot 180.

The robot 190 includes robot arms 194a and 194b with corresponding grasping end effectors 196a and 196b, that each take the form of a gripper with two opposing actuable members. The robot 190 also includes a base 193 with wheels 197a and 197b provided on opposed sides thereof for locomotion of the robot 190. The base 193 may include, for example, one or more motors for driving corresponding wheels 197a and 197b to achieve a desired direction, velocity, and/or acceleration of movement for the robot 190.

The robot 190 also includes two vision sensors: monographic camera 199a and 3D laser scanner 199b. A monographic camera captures vision sensor data and the vision sensor data at a given instance may be utilized to generate a two-dimensional ("2D") image at the given instance. A 3D laser scanner includes one or more lasers that emit light and one or more sensors that generate sensor data related to reflections of the emitted light. The generated vision sensor data from a 3D laser scanner may be utilized to generate 3D point cloud data, where each of the 3D points of the 3D point cloud defines a 3D coordinate of a surface of a corresponding object. A 3D laser scanner may be, for example, a time-of-flight 3D laser scanner or a triangulation based 3D laser scanner and may include a position sensitive detector (PSD) or other optical position sensor.

As described herein, robot 190 may operate autonomously at least part of the time and control actuators thereof to grasp an object based on grasp poses, forces, and/or other grasping parameters that are generated by autonomous grasp attempt engine 118 in view of grasping parameters associated with an object model of the object in grasping parameters for object models database 150. For example, the robot 130B may control the wheels 197a and/or 197b, the robot arms 194a and/or 194b, and/or the end effectors 196a and/or 196b to grasp the object.

As also described herein, the robot 190 may also be physically manipulated by a human user to "kinesthetically teach" the grasping parameters to associate with an object model in the grasping parameters for object models database 150. For example, the robot arms 194a, 194b, the end effectors 195a, 195b, and/or other operational component(s) of the robot 190 may be physically manipulated by a human user. For instance, in some implementations the robot 190 may set the mechanical impedance of one or more of its operational components, during one or more periods of time, such that physical manipulation by a user will cause one or more of the components to traverse to a plurality of poses.

Although particular robots 180 and 190 are illustrated in FIG. 1, additional and/or alternative robots may be utilized, including robots having other robot arm forms, robots having a humanoid form, robots having an animal form, other robots that move via one or more wheels (e.g., other self-balancing robots), submersible vehicle robots, an unmanned aerial vehicle ("UAV"), and so forth. Also, although particular grasping end effectors are illustrated in FIG. 1, additional and/or alternative end effectors may be utilized, such as alternative impactive grasping end effectors (e.g., those with grasping "plates", those with more or fewer actuable members such as "digits"/"claws"), "ingressive" grasping end effectors, "astrictive" grasping end effectors, or "contigutive" grasping end effectors, etc.

Turning now to the grasp parameters system 110, it is illustrated as separate from, but in communication with, both of robots 180 and 190. In some implementations, all or aspects of grasp parameters system 110 may be implemented on robot 180 and/or robot 190 (e.g., via one or more processors of robots 180 and 190). For example, robots 180 and 190 may each include an instance of the grasp parameters system 110. In some implementations, all or aspects of grasp parameters system 110 may be implemented on one or more computer systems that are separate from, but in network communication with, robots 180 and/or 190. Moreover, in some of those implementations, each of the robots 180 and 190 may have their own dedicated instance of the grasp parameters system 110.

The object model pose engine 112 of grasp parameters system 110 determines an object model that conforms to an object in an environment of a robot, and determines an object model pose of the object model. The object model pose indicates the object pose of the object in the environment. The object model pose engine 112 is in communication with object models database 152, which stores three-dimensional ("3D") or other models that conform to various objects. For example, the object models database 152 may store one or more 3D models that are each specific to a particular physical object (e.g., a particular spatula) and store one or more 3D models that are applicable to multiple physical objects (e.g., a cylindrical model that is applicable to multiple spray cans, multiple canned food items, etc.).

The object model pose engine 112 receives vision sensor data from a vision sensor of a robot viewing an environment of the robot, determines a 3D model from object models database 152 that matches some of the vision sensor data, and determines an object model pose of the 3D model based on the object model and the vision sensor data. The object model pose may be determined utilizing various object detection and pose estimation techniques, such as techniques that determine the object model pose based on a determined "best fit" between vision sensor data and the object model.

As one example, the object model pose engine 112 may receive 3D point cloud data generated by the stereographic camera 189, compare the 3D point cloud data to various 3D models, and determine a 3D model of a spatula that maps to the 3D point cloud data capturing the spatula 103 of FIG. 1. The object model pose engine 112 may further determine an object model pose that indicates the pose of the spatula 103 based on a pose of the 3D model of the spatula that is a best fit to the 3D point cloud data that captures the spatula 103. The object model pose may be defined with respect to one or more reference frames, such as a reference frame of the robot 180 or a so-called map frame/world frame.

The sensor data engine 114 identifies sensor data generated by one or more sensors of a robot during physical manipulation of the robot by a user in association with the user kinesthetically teaching grasping parameters for an object model identified by object model pose engine 112. For example, the object model pose engine 112 may identify a 3D model for the spatula 103, an object model pose for that 3D model, and the sensor data engine 114 may identify sensor data generated by the robot 180 during physical manipulation of the robot 180 by the user to cause the robot 180 to perform all or part of a grasp sequence for grasping of the spatula 103 by the robot 180.

The sensor data identified by sensor data engine 114 may include, for example: sensor data that indicates position values of one or more actuators during the physical manipulation, where those actuators control the pose of an end effector of the robot; and/or sensor data that indicates force applied by the robot to an object during the physical manipulation by the user. The sensor data that indicates position values of the actuators may be, for example, sensor data from one or more position sensors associated with actuators that control the pose of the end effector. The sensor data that indicates force applied by the robot to an object during the physical manipulation by the user may be, for example, sensor data from a force torque sensor, such as a force torque sensor at a "wrist" of the robot at a connection between the end effector and other components of the robot.

In some implementations, the sensor data engine 114 utilizes user interface input provided by a user to determine sensor data that should be utilized to generate one or more grasping parameters. For example, a user may provide spoken user interface input that is sensed by a microphone associated with the robot, may actuate a physical or virtual button associated with the robot, and/or provide other user interface input to indicate which sensor data from a physical manipulation of the user should be utilized to generate one or more grasping parameters. For instance, after physically manipulating the end effector to a pre-grasp pose the user may speak "record pre-grasp pose" or another phrase to indicate that sensor data at that time should be utilized to determine a pre-grasp pose. Further, the phrase (or another phrase) may indicate that sensor data indicating force value(s), that occur within a threshold amount of time following that time, should be utilized to determine a translational force measure.

The grasping parameters engine 116 utilizes the sensor data identified by sensor data engine 114, and the object model and/or object model pose determined by object model pose engine 112, to determine one or more grasping parameters to associate with the object model. The grasping parameters engine 116 stores the determined grasping parameters, and an association of the determined grasping parameters to the corresponding object model, in grasping parameters for object models database 150.

For example, the grasping parameters engine 116 may utilize the sensor data and the object model pose to determine one or more end effector poses (e.g., at least a pre-grasp pose) of the grasping end effector during the physical manipulation, where each of the end effector poses defines a pose of the grasping end effector relative to the object model. For instance, the sensors may include one or more position sensors associated with actuators that control the end effector pose, and the positions sensors may generate sensor data that indicate position values. The grasping parameters engine 116 may utilize the position values indicated by sensor data for a given time of the physical manipulation to determine a pose of the end effector relative to a reference frame (e.g., a robot frame) at the given time, and that pose converted to an end effector pose (that is relative to the object model) based on the determined object model pose. For example, if the pose of the end effector and the object model pose are both relative to the same reference frame, the grasping parameters engine 116 may transform the pose of the end effector in view of the object model pose to obtain an end effector pose that is relative to the object model.

As another example, the grasping parameters engine 116 may utilize the sensor data to determine at least one translational force measure indicating translational force applied by the robot to the object during the physical manipulation by the user, where the force applied to the object is at least partially the result of translation of an entirety of the grasping end effector (e.g., a result of movement of one or more actuators that are "upstream" of the end effector and whose positions influence the pose of the entirety of the end effector). For instance, the sensors may include a force torque sensor at a "wrist" of the robot at a connection between the end effector and other components of the robot, and the force torque sensor may generate sensor data indicative of force values. The grasping parameters engine 116 may utilize the force values indicated by sensor data for one or more times of the physical manipulation to determine the force measure. For example, the grasping parameters engine 116 may determine the translational force measure based on an average of the force values indicated by sensor data at a plurality of times, a maximum force value indicated by the sensor data, a plurality of force values over time, and/or based on other function of the force values indicated by the sensor data.

As described with respect to sensor data engine 114, in some implementations a user may provide user interface input to indicate when sensor data should be utilized to generate one or more grasping parameters. In some of those implementations, the user interface input may indicate which sensor data should be utilized to generate one or more grasping parameters. For example, a user may provide spoken user interface input, such as "record pre-grasp pose", to indicate that sensor data at that time should be utilized to determine a pre-grasp pose. The sensor data engine 114 may indicate the sensor data that corresponds to that time is to be utilized to generate a pre-grasp pose and the grasping parameters engine 116 may utilize such an indication to determine that sensor data should be utilized to determine the pre-grasp pose. Also, for example, the user may provide further spoken input such as "attempting grasp", to indicate that upcoming sensor data should be utilized to determine one or more additional end effector poses and/or to determine a translational force measure. The sensor data engine 114 may indicate the sensor data that follows the spoken input is to be utilized to generate a translational force measure and/or additional poses and the grasping parameters engine 116 may utilize such an indication to determine that sensor data should be utilized.

In some implementations, in determining grasping parameters for an object model, grasping parameters engine 116 utilizes end effector pose(s) and/or force measure(s) determined from multiple physical manipulations (of the same robot or different robot(s)) that are each associated with grasping a respective object associated with the object model. In some of those implementations, the end effector pose(s) and/or force measure(s) from multiple physical manipulations may optionally be analyzed to determine one or more "combined end effector poses" and/or "combined force measures". For example, a combined force measure may be based on a mean, average, and/or other statistical function of a plurality of the force measures. As one example, a first user may physically manipulate robot 180 to perform at least a part of a grasp sequence for grasping of spatula 103 and a second user may physically manipulate robot 190 to perform at least part of a grasp sequence for the spatula 103 and/or similar spatula. Grasping parameters for an object model that corresponds to the spatula 103 may be generated based on sensor data from the manipulations of robot 180 and 190. For example, sensor data associated with the manipulation of robot 180 may be utilized to determine a first pre-grasp pose to associate with the object model and sensor data associated with the manipulation of robot 190 may be utilized to determine a separate second pre-grasp pose. Also, for example, sensor data associated with the manipulations of robot 180 and 190 may be utilized to determine an average or other combined pre-grasp pose. Also, for example, sensor data associated with the manipulations of robot 180 and 190 may be utilized to determine an average or other combined translational force measure.

Autonomous grasp attempt engine 118 utilizes previously determined grasping parameters for object models, and object model poses determined by object model pose engine 112, to autonomously attempt grasps of objects. As one example, assume a given object is within a working space of a robot and that the object is in the field of view of a vision sensor associated with the robot. The object model pose engine 112 may utilize vision sensor data from the vision sensor to determine an object model that conforms to the object and to further determine an object model pose of the object model. The autonomous grasp attempt engine 118 may access grasping parameters for object models database 150 to identify a stored association of the object model to one or more end effector poses and one or more translational force measures. The autonomous grasp attempt engine 118 may utilize the object model pose, the end effector pose(s), and the translational force measure(s) to determine control commands to provide to one or more actuators of the robot to attempt a grasp of the object. The determined control commands include commands determined to cause the grasping end effector to achieve the end effector poses relative to the object in the environment and to cause the end effector to impart a force that is based on the translational force measure and imparted through translation of an entirety of the grasping end effector. The control commands may be provided to the one or more actuators of the robot. For example, where a pre-grasp pose and a translational force measure are associated with the object model, control commands can be provided to cause the grasping end effector to be adjusted to the pre-grasp pose, then moved toward the object until a force torque sensor generates sensor data indicating the force indicated by the translational force measure has been achieved (through contact with the object), at which point one or more actuable members of the grasping end effector may be actuated to grasp the object.

Grasping parameters for object models database 150 and object models database 152 may be provided on one or more non-transitory computer readable storage media. In some implementations, the databases 150 and 152 may be combined. In some implementations, one or more (e.g., all) aspects of databases 150 and/or 152 may be stored in one or more non-transitory computer readable storage media that are local to the robot 180 and/or 190. In some implementations, one or more (e.g., all) aspects of databases 150 and/or 152 may be stored in one or more non-transitory computer readable storage media that are separate from the robot 180 and/or 190 and the robot 180 and/or 190 may access the databases 150 and/or 152 via a direct connection and/or via one or more networks such as a local area network and/or a wide area network (e.g., the Internet).

Figure 2A:
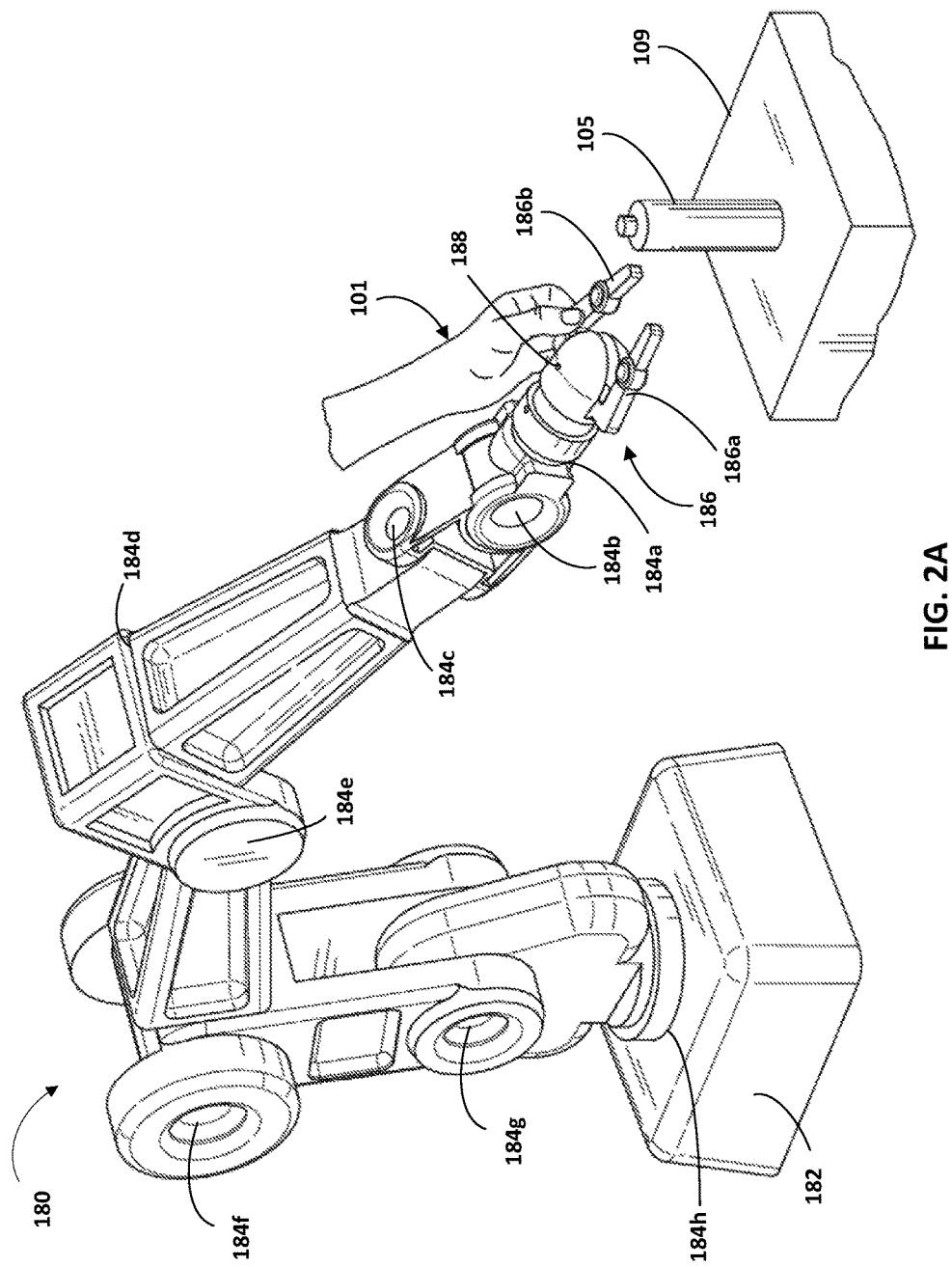
FIGS. 2A, 2B, and 2C illustrate one of the robots of FIG. 1, an example object, and illustrates the robot at three different times during manipulation of the robot by the user to cause a grasping end effector of the robot to perform a grasp sequence for grasping of the object.
Figure 2B:
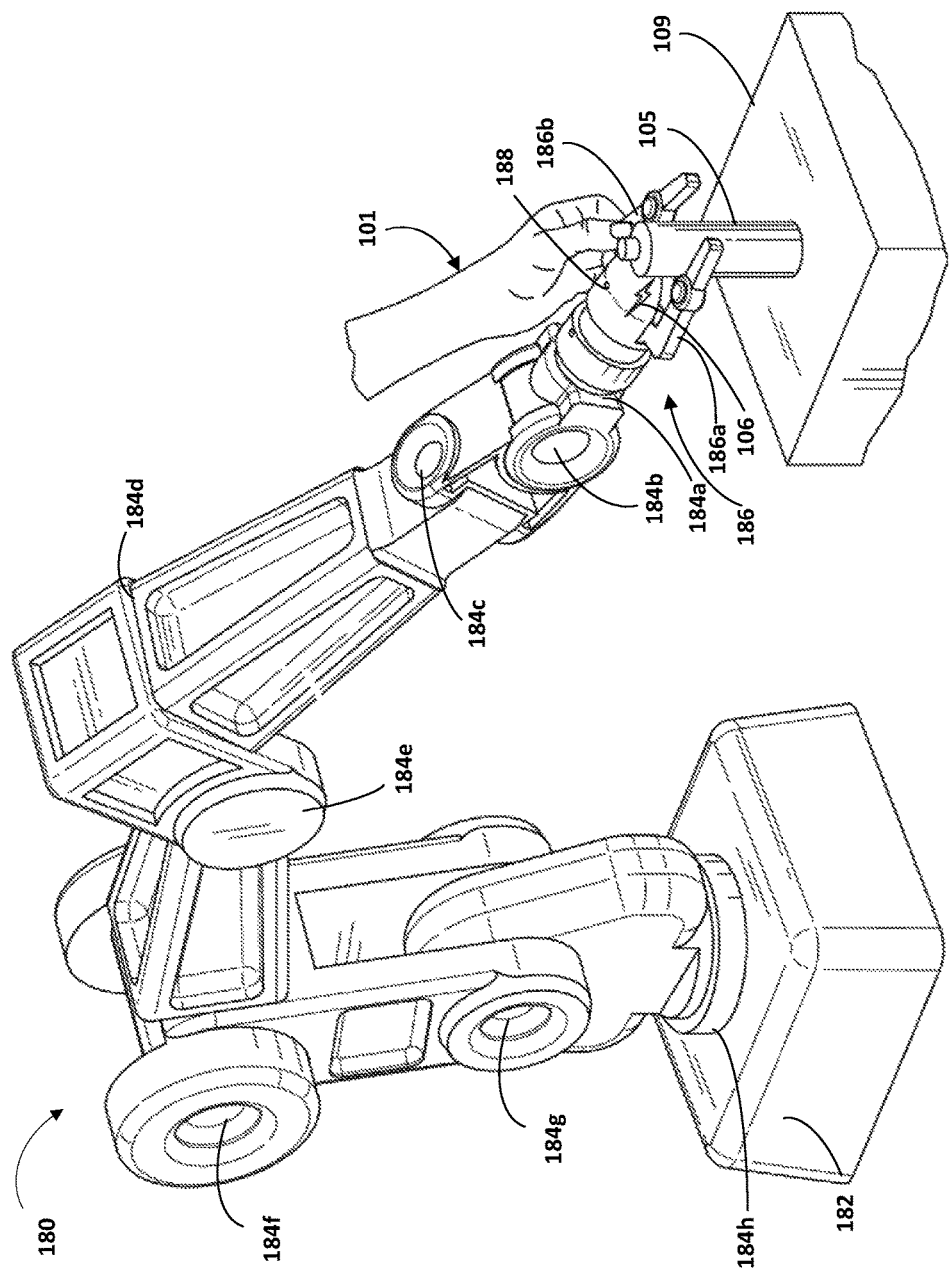
Figure 2C:
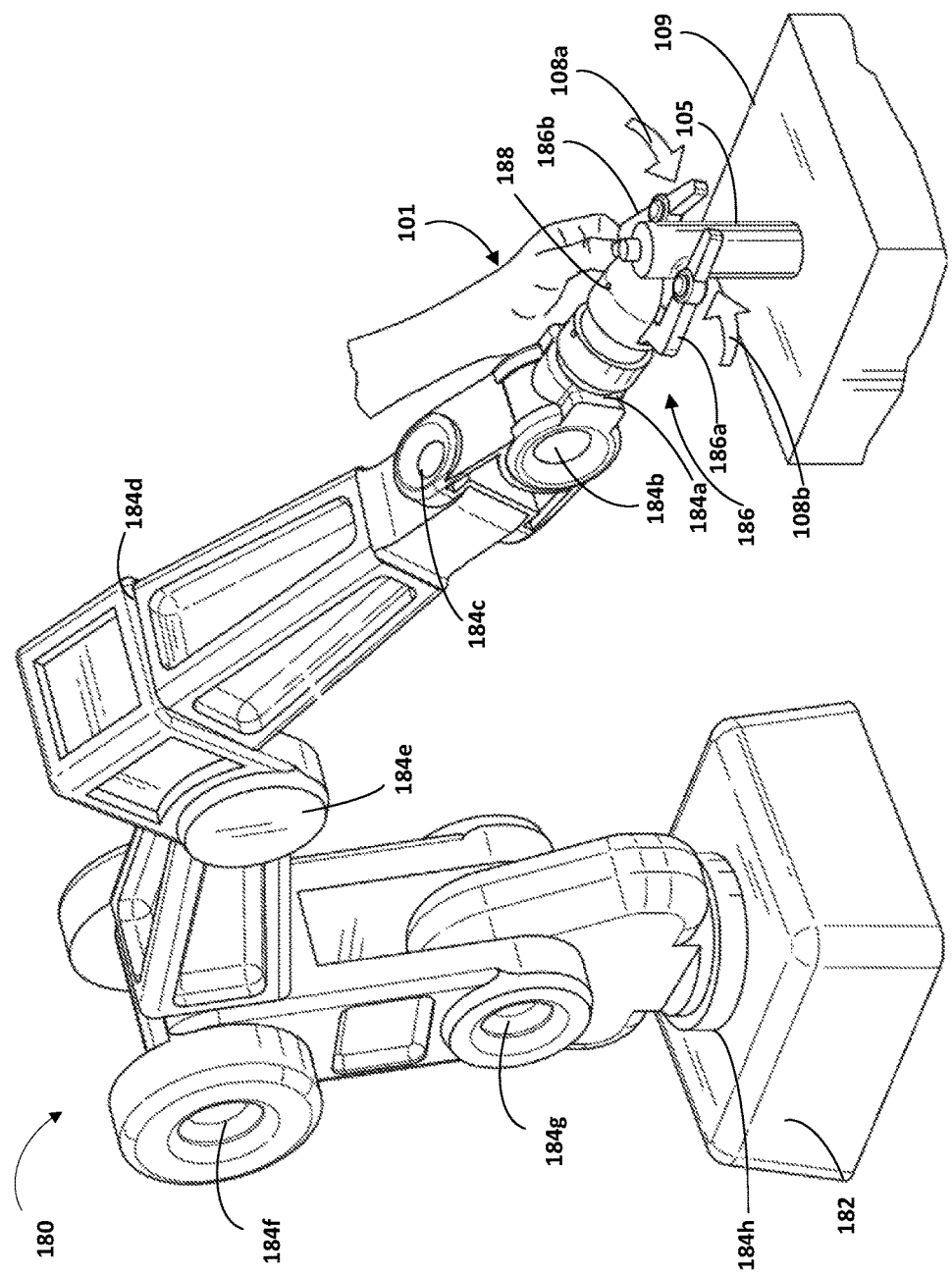

Turning now to FIGS. 2A-2C, additional description is provided of some implementations of robot 180 and engines 112, 114, and 116 of grasp parameters system 110. FIGS. 2A-2C each illustrate the robot 180 of FIG. 1, and a user's hand 101 grasping the end effector 186 of the robot 180 during physical manipulation of the robot 180 by the user. Also illustrated in each of FIGS. 2A-2C is a spray can 105 resting on a surface 109. FIGS. 2A-2C illustrate the robot 180 at three different times during physical manipulation of the robot 180 by the user to perform a grasp sequence for grasping of the spray can 105. As described herein, the robot 180 may be in a gravity compensated mode during all or portions of the physical manipulation of the robot 180 by the user.

As indicated in FIG. 2A, the illustrated robot 180 includes a base 182 and eight actuators 184a-h that provide degrees of freedom for the robot and provide the robot 180 with kinematic redundancy. Robot 180 may include other actuators, such as one or more actuators that control opening/closing of actuable members 186a, 186b of end effector 186, but those are not labeled in FIG. 2 for the sake of clarity and brevity. Robot 180 may be physical manipulated by the user to cause the robot 180 traverse any one of a plurality of possible paths when moving reference point 188 of end effector 186 from a first location to a second location. Moreover, the kinematic redundancy of the robot 180 enables the robot 180 to traverse along the same path in multiple ways, each time striking a different set of orientations along the path. As used herein, an "orientation" of a robot refers to a particular configuration of components of a robot relative to one another at a particular position of the reference point 188 (e.g., a "snapshot"). When robot 180 is static, it may be in (or "strike") a single orientation until it moves again. When the reference point 188 is moved along a path, the robot 180 may strike a series of orientations to effectuate the movement along the path.

Although not illustrated, the stereographic camera 184 (FIG. 1) may be provided with the robot in FIGS. 2A-2C and the spray can 105 may be included in the field of view of the stereographic camera 184. The object model pose engine 112 may utilize 3D point cloud data from the stereographic camera 184 to determine an object model (from database 150) that conforms to the spray can 105, and to determine an object model pose of the object model. The object model pose of the object model estimates the pose of the spray can 105 in the environment illustrated in FIGS. 2A-2C. In other words, the object model pose defines the orientation and position of the spray can 105 relative to a reference frame.

In FIG. 2A, the user has physically manipulated the robot 180 to place the end effector 186 in a pre-grasp pose relative to the spray can 105. Grasping parameters engine 116 may utilize sensor data from a time corresponding to FIG. 2A, and the object model pose, to determine a pre-grasp pose of the end effector 186 relative to the spray can 105. For example, the grasping parameters engine 116 may utilize sensor data from position sensors associated with actuators 184a-h to determine a pose of the end effector 186 relative to a reference frame. The grasping parameters engine 116 may further utilize the object model pose that estimates the pose of the spray can 105 to convert the pose of the end effector relative to a reference frame, to a pre-grasp pose that is relative to the object model 105.

Although not illustrated, robot 180 may also include and/or be in communication with one or more user interface input devices, such as a button or other user interface element located on an exterior surface of the robot 180, a virtual user interface element provided via a tablet or other computing device in communication with the robot 180, and/or a microphone included with the robot 180 and/or in communication with the robot. As described herein, in some implementations a user may provide user interface input via the user interface element to, for example: indicate the initiation and/or conclusion of a grasp sequence through physical manipulation of the robot 180; to indicate that current and/or upcoming poses and/or forces are intended to be analyzed for grasping parameters; etc. For example, the user may provide user interface input via the user interface input device to indicate that the pose of the end effector 186 of FIG. 2A should be utilized to determine a pre-grasp pose. As described herein, the sensor data engine 114 may optionally utilize such user interface input to determine sensor data for which grasp parameters are to be generated and/or to indicate which grasp parameters are to be determined based on given sensor data.

In FIG. 2B, the user has further physically manipulated the robot 180 to move the end effector 186 from the pose illustrated in FIG. 2A, to that illustrated in FIG. 2B. In FIG. 2B the physical manipulation by the user has caused the end effector 186 to contact the spray can 105, as indicated by contact indication 106. The applied contact is a result of translation of the entirety of the end effector 186 through the physical manipulation of the user. In other words, the applied contact is not solely attributable to actuation (if any) of actuable members 186a and 186b. Rather, the applied contact is based at least in part on translation of the end effector 186 that is effectuated (in response to physical manipulation by the user) through movement of one or more actuators upstream of the end effector 186 (e.g., one or more of the actuators 184*a-h*).

The force imparted by the contact may be sensed by one or more sensors of the robot 180. For example, the robot 180 may include a force torque sensor at or near its coupling with the actuator 184*a* and sensor data generated by the robot 180 may include sensor data generated by that force torque sensor. The grasping parameters engine 116 may utilize sensor data from the force torque sensor to determine a translational force measure to assign to the object model that conforms to the spray can. The translational force measure may be based on sensor data from the force torque sensor at a time corresponding to FIG. 2B and/or sensor data from the force torque sensor before or after the time corresponding to FIG. 2B. The grasping parameters engine 116 may further optionally determine one or more additional end effector poses relative to the object model based on sensor data from position sensors at the time of FIG. 2B and/or based on sensor data from position sensors at one or more times between FIGS. 2A and 2B.

In FIG. 2C, the user has further physically manipulated the pose of the end effector 186 from the pose illustrated in FIG. 2B, to that illustrated in FIG. 2C, by physically manipulating the actuable member 186*b* to cause the actuable members 186*a* and 186*b* to close (as indicated by arrows 108*a* and 108*b*) and contact the spray can 105. The grasping parameters engine 116 may utilize sensor data from position sensor(s) associated with the actuable members 186*a*, 186*b* and actuators 184*a-h* to determine a pose of the end effector 186 relative to a reference frame. The grasping parameters engine 116 may further utilize the object model pose that estimates the pose of the spray can 105 to convert that pose to grasping pose that is relative to the object model 105, and store the grasping pose and an association to the object model in database 150. The grasping parameters engine 116 may also optionally utilize sensor data from an optional force torque sensor associated with the actuable members 186*a*, 186*b* to determine a grasping force imparted on the spray can 105 solely by the actuable members 186*a*, 186*b*, and store the grasping force and an association to the object model in database 150. Although the closing of the actuable members 186*a*, 186*b* of FIG. 2C and the contact indicated by the contact indication 106 of FIG. 2B are illustrated in two separate figures as occurring at two separate times, it is understood that in some implementations the events may occur at the same time.

Also, although FIG. 2C illustrates a user physically manipulating the actuable members 186*a*, 186*b* to close them, in some implementations the actuable members may close automatically in response to sensing the contact indicated by contact indication of FIG. 2B and/or may close in response to user interface input of the user (e.g., a verbal command). Moreover, in yet other implementations the actuable members may not be closed during kinesthetic teaching via physical manipulation of the robot 180 by a user. For example, the physical manipulation by the user may cease at FIG. 2B and one or more end effector poses of the end effector 186 relative to the object model, and a translational force measure, determined based on physical manipulations of FIGS. 2A and 2B (and/or between FIGS. 2A and 2B)—and stored in association with the object model. For instance, an ordered group of end effector poses may be determined that starts with a pre-grasp pose that corresponds to the end effector pose of FIG. 2A, followed by one or more (e.g., all) end effector poses between the pose of FIG. 2A and the pose of FIG. 2B, and concludes with the end effector pose of FIG. 2B. Likewise, a translational force measure may be determined based on the contact indicated by FIG. 2B, and the translational force measure and the ordered group of end effector poses stored and associated with the object model.

Figure 3:
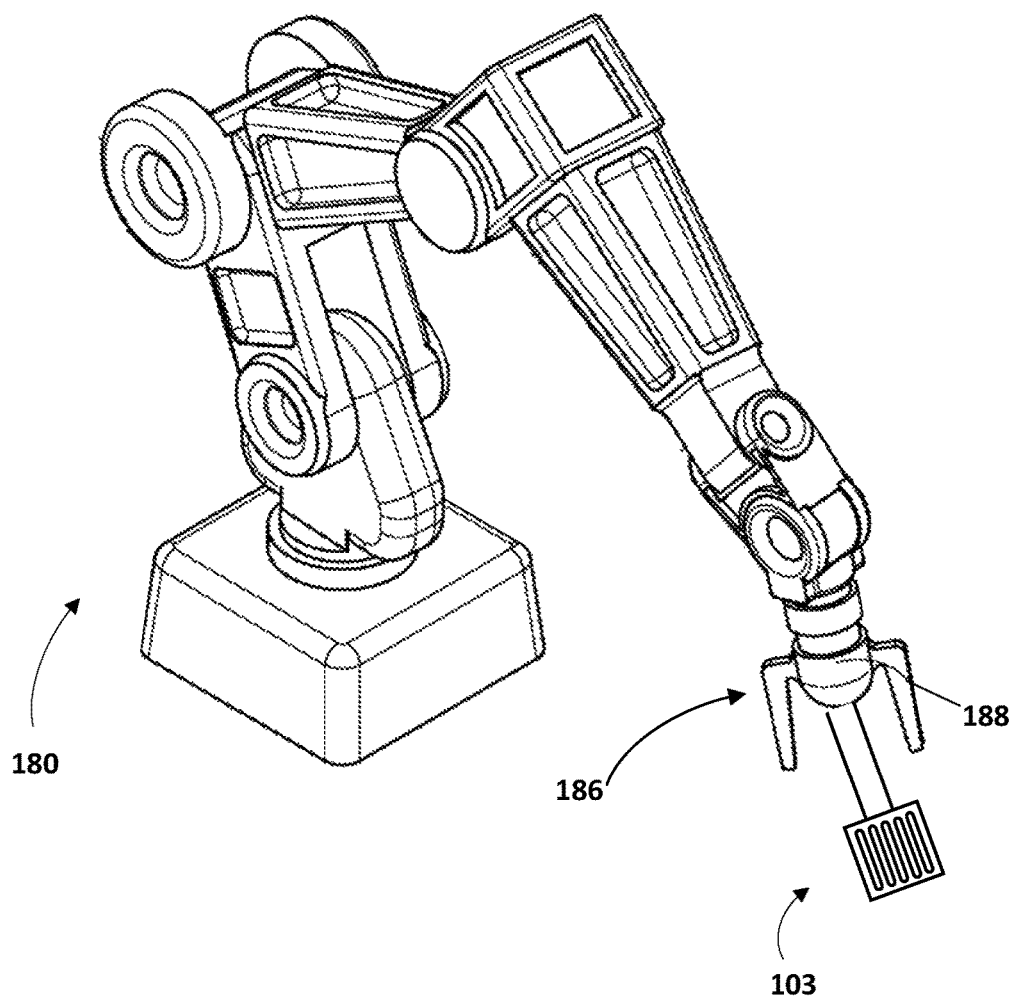
FIG. 3 illustrates the robot of FIGS. 2A-2C, an additional example object, and an example end effector pose of the grasping end effector of the robot that may be determined based on disclosed implementations.

Turning now to FIG. 3, additional description is provided of some implementations of robot 180 and of engine 118 of grasp parameters system 110. FIG. 3 illustrates the robot 180 of FIGS. 1 and 2A-2C, the spatula 103 of FIG. 1. It is noted that only end effector 186 and end effector reference point 188 of robot 180 are numbered in FIG. 3 for the sake of simplification.

In FIG. 3, the end effector 186 of robot 180 is in an end effector pose that may be determined based on disclosed implementations. For example, grasping parameters for an object model that conforms to the spatula 103 may be stored in grasping parameters for object models database 150 and may have optionally been determined based on kinesthetic teaching as described herein. The grasping parameters for the object model may define a pre-grasp pose for the object model and autonomous grasp attempt engine 118 may determine the end effector pose of FIG. 3 based on the pre-grasp pose. For example, although not illustrated, the stereographic camera 184 (FIG. 1) may be provided with the robot in FIG. 3 and the spatula 103 may be included in the field of view of the stereographic camera 184. The object model pose engine 112 may utilize 3D point cloud data from the stereographic camera 184 to determine an object model (from database 150) that conforms to the spatula 103, and to determine an object model pose of the object model relative to a reference frame. The autonomous grasp attempt engine 118 may utilize the object model pose to convert the pre-grasp pose (defined in database 150 relative to the object model) to an end effector pose that is also relative to the reference frame. The autonomous grasp attempt engine 118 may then provide control commands to one or more actuators that control the pose of the end effector 186 to cause the end effector to traverse to that end effector pose.

From the end effector pose illustrated in FIG. 3, the robot 180 may attempt a grasp of the object by further adjustment of the pose of the end effector 186, optionally in view of a translational force measure(s) and/or additional end effector pose(s) also associated in database 150 with the object model for the spatula 103. For example, the autonomous grasp attempt engine 118 may provide control commands to cause the robot 180 to move the end effector 186 toward the spatula 103 until sensor data from a force torque sensor indicates a translational force measure is achieved and/or force is within a threshold of the translational force measure, at which time the robot 180 may move actuable members 186*a* and 186*b* toward one another until they are either at a fully closed position or a torque reading or other reading measured by torque or other force sensor(s) associated with the members satisfies a threshold. In some implementations, in moving the end effector 186 toward the spatula 103 and/or in moving actuable members 186*a* and 186B, the autonomous grasp attempt engine 118 may determine the control commands in view of additional end effector poses that are associated with the object model in the database 150. For example, the database 150 may define an ordered group of end effector poses for the object model and the autonomous grasp attempt engine 118 may determine the control commands to cause the end effector poses to be achieved in the order indicated by the ordered group.

Figure 4:
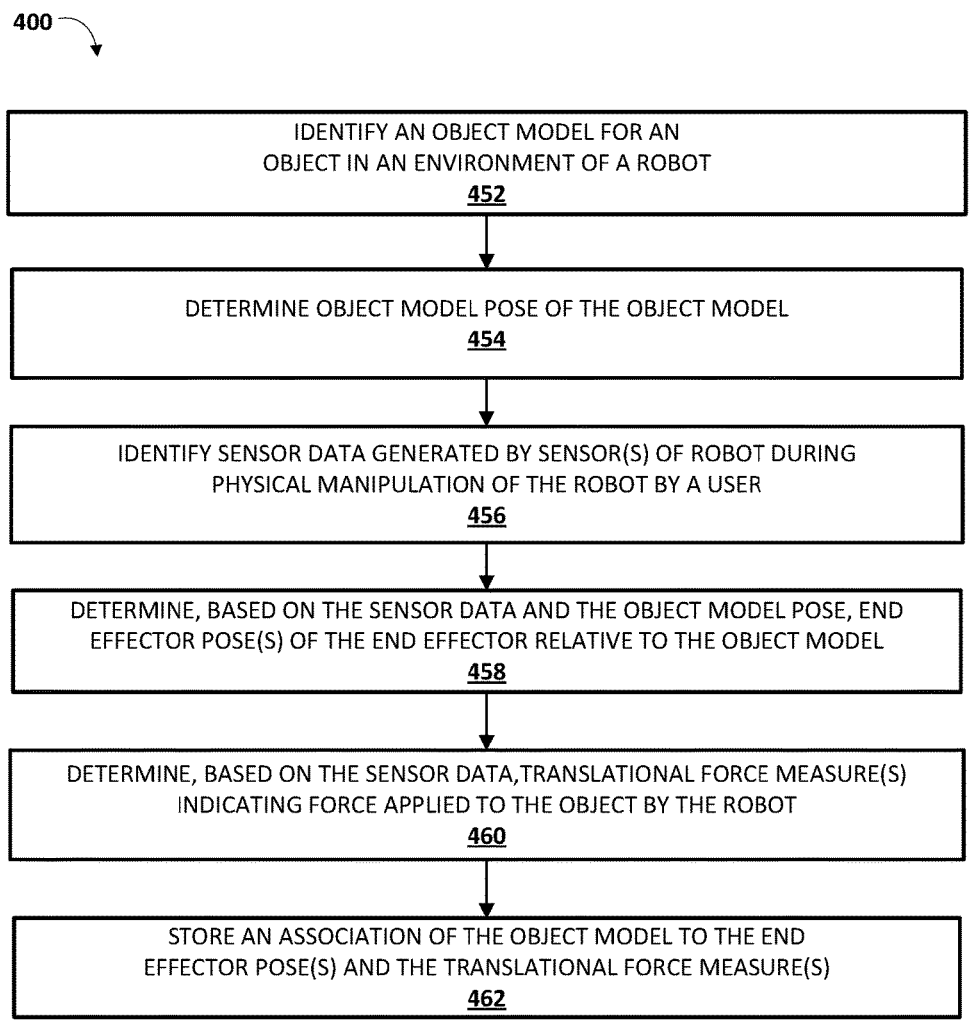
FIG. 4 is a flowchart illustrating an example method of determining, based on sensor data generated during physical manipulation of a robot by a user, one or more grasp parameters to associate with an object model.

FIG. 4 is a flowchart illustrating an example method 400 of determining, based on sensor data generated during physical manipulation of a robot by a user, one or more grasp parameters to associate with an object model. For convenience, the operations of the flow chart are described with reference to a system that performs the operations. This system may include engines 112, 114, and/or 116 of grasp parameters system 110, which may be implemented by one or more components of a robot, such as a processor and/or robot control system of robot 180, 190, 620, and/or other robot; and/or may be implemented by one or more computing device(s) that are separate from a robot, such as computing device 710. Moreover, while operations of method 400 are shown in a particular order, this is not meant to be limiting. One or more operations may be reordered, omitted or added.

At block 452, the system identifies an object model for an object in an environment of a robot. For example, the system may receive 3D point cloud data from a vision sensor associated with the robot, compare the 3D point cloud data to various stored 3D models, and determine a stored 3D model that maps to the 3D point cloud data.

At block 454, the system determines an object model pose of the object model. For example, the system may determine the object model pose based on that object model pose providing the best fit to the 3D point cloud data.

At block 456, the system identifies sensor data generated by sensor(s) of the robot during physical manipulation of the robot by the user. The sensor data identified by the system may include, for example: sensor data that indicates position values of one or more actuators during the physical manipulation, where those actuators control the pose of an end effector of the robot; and/or sensor data that indicates force applied by the robot to an object during the physical manipulation by the user. In some implementations, the system utilizes user interface input provided by a user to determine sensor data that should be utilized to generate one or more grasping parameters. For example, the user interface input may indicate a start and an end of a grasp sequence through physical manipulation, and the system may identify sensor data that occurs between the indicated start and end of the grasp sequence.

At block 458, the system determines, based on the sensor data and the object model pose, end effector pose(s) of the end effector relative to the object model. For example, the system may determine at least a pre-grasp pose and/or or an ordered group of poses of the grasping end effector during the physical manipulation. For instance, the sensor data may include sensor data that indicates position values of one or more position sensors associated with actuators that control the end effector pose. The system may utilize the position values indicated by sensor data for a given time of the physical manipulation to determine a pose of the end effector relative to a reference frame (e.g., a robot frame) at the given time. For example, the system may determine the pose of the end effector at the given time by applying the position values to a forward kinematic model of the robot. The system may further utilize the object model pose to convert a determined pose to an end effector pose at the given time that is relative to the object model. For example, if the pose of the end effector and the object model pose are both relative to the same reference frame, the system may transform the pose of the end effector in view of the object model pose to obtain an end effector pose that is relative to the object model.

At block 460, the system determines, based on the sensor data, at least one translational force measure indicating force applied to the object by the robot, where the force applied to the object is at least partially the result of translation of an entirety of the grasping end effector. For instance, the sensor data may include sensor data that indicates force value(s) and that is generated by a force torque sensor of the robot. The system may utilize the force value(s) to determine the translational force measure.

At block 462, the system stores, in one or more computer readable media, an association of the object model to the end effector pose(s) and the translational force measure(s).

Figure 5:
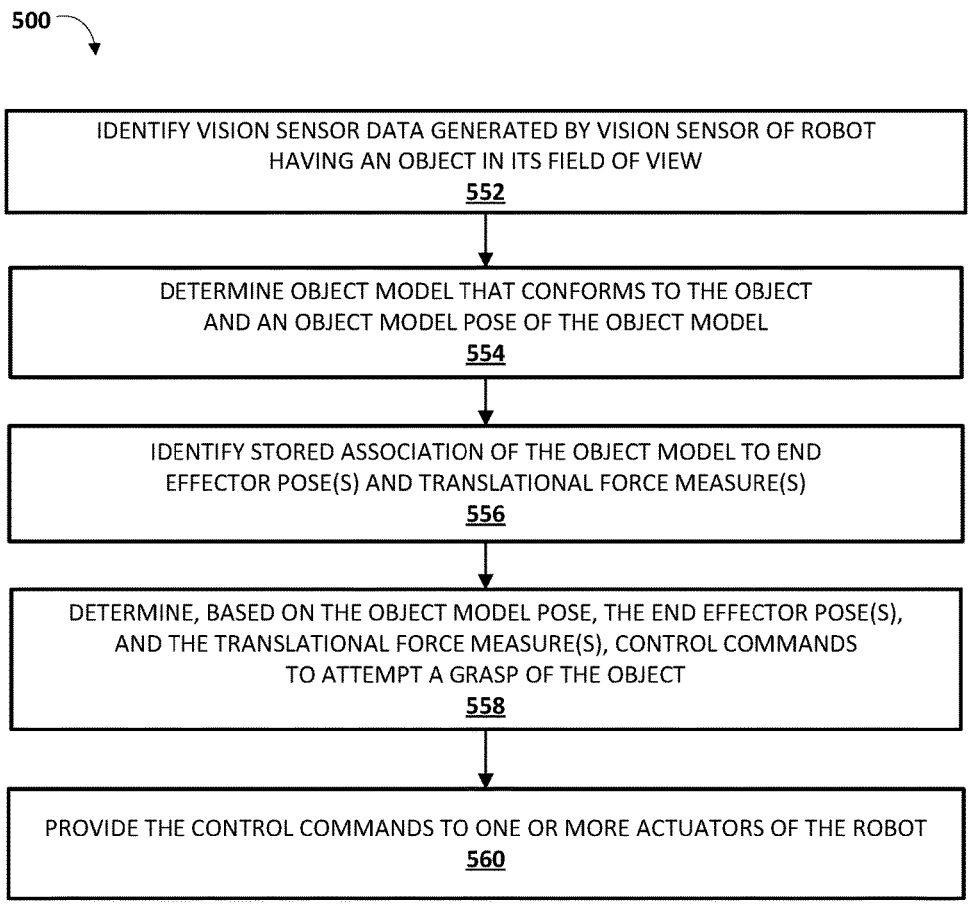
FIG. 5 is a flowchart illustrating an example method of determining control commands to provide to actuator(s) of a robot to attempt a grasp of an object based on grasp parameters associated with an object model that conforms to the object.

FIG. 5 is a flowchart illustrating an example method 500 of determining control commands to provide to actuator(s) of a robot to attempt a grasp of an object based on grasp parameters associated with an object model that conforms to the object. For convenience, the operations of the flow chart are described with reference to a system that performs the operations. This system may include autonomous grasp attempt engine 118 of grasp parameters system 110, which may be implemented by one or more components of a robot, such as a processor and/or robot control system of robot 180, 190, 620, and/or other robot; and/or may be implemented by one or more computing device(s) that are separate from a robot, such as computing device 710. Moreover, while operations of method 500 are shown in a particular order, this is not meant to be limiting. One or more operations may be reordered, omitted or added.

At block 552, the system identifies vision sensor data generated by a vision sensor of a robot having an object in its field of view. For example, the system may receive 3D point cloud data from a vision sensor associated with the robot.

At block 554, the system determines an object model that conforms to the object and determines an object model pose of the object model. For example, the system may compare received 3D point cloud data to various stored 3D models, and determine a stored 3D model that maps to the 3D point cloud data. The system may further determine the object model pose based on that object model pose providing the best fit to the 3D point cloud data.

At block 556, the system identifies a stored association of the object model to end effector poses(s) and translational force measure(s).

At block 558, the system determines, based on the object model pose, the end effector pose(s) and the translational force measure(s), control commands to attempt a grasp of the object.

For example, the identified end effector poses may each be defined relative to the object model. The system may convert the identified end effector poses to corresponding poses that are relative to a reference frame, and that take the object model pose determined at block 554 into account. For example, for a given end effector pose relative to an object model, the system may convert that end effector pose to a pose in a reference frame based on the object model pose determined in that reference frame at block 554. With the converted poses, the system may determine control commands to provide to actuators of the robot to cause a grasping end effector of the robot to achieve the end effector poses relative to the object in the environment. For instance, the system may determine the control commands based on applying the converted poses to a kinematic model of the robot and identifying actuator position values to achieve those poses.

The system may further determine the control commands to cause the end effector to be moved through the one or more poses (and optionally additional poses not stored in association with the object model) until a force torque sensor generates sensor data indicating the force indicated by the translational force measure has been achieved (through contact with the object) and/or force is within a threshold of the translational force measure. The system may further determine the control commands to cause the one or more actuable members of the grasping end effector to be actuated to grasp the object, such as when at least a threshold level (e.g., any measurable level) of force is indicated by sensor data, or when force is indicated by the sensor data that is within a threshold of the translational force measure.

At block 560, the system provides the control commands to one or more actuators of the robot to attempt a grasp of the object. As described herein, the term actuator encompasses a mechanical or electrical device that creates motion, in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

Figure 6:
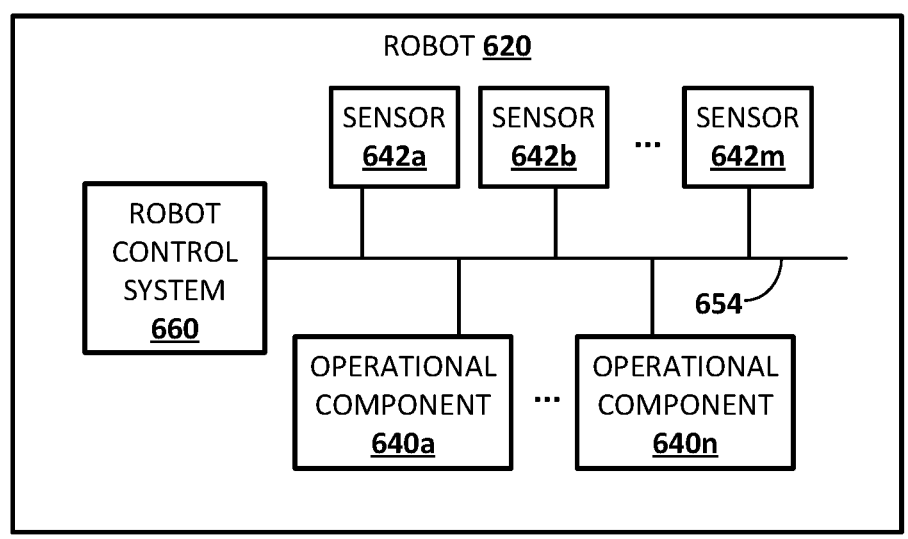
FIG. 6 schematically depicts an example architecture of a robot.

FIG. 6 schematically depicts an example architecture of a robot 620. The robot 620 includes a robot control system 660, one or more operational components 640a-640n, and one or more sensors 642a-642m. The sensors 642a-642m may include, for example, vision sensors (e.g., camera(s), 3D scanners), light sensors, pressure sensors, pressure wave sensors (e.g., microphones), proximity sensors, accelerometers, gyroscopes, thermometers, barometers, and so forth. While sensors 642a-m are depicted as being integral with robot 620, this is not meant to be limiting. In some implementations, sensors 642a-m may be located external to robot 620, e.g., as standalone units.

Operational components 640a-640n may include, for example, one or more end effectors (e.g., grasping end effectors) and/or one or more servo motors or other actuators to effectuate movement of one or more components of the robot. For example, the robot 620 may have multiple degrees of freedom and each of the actuators may control actuation of the robot 620 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 660 may be implemented in one or more processors, such as a CPU, GPU, and/or other controller(s) of the robot 620. In some implementations, the robot 620 may comprise a "brain box" that may include all or aspects of the control system 660. For example, the brain box may provide real time bursts of data to the operational components 640a-n, with each of the real time bursts comprising a set of one or more control commands that dictate, inter alia, the parameters of motion (if any) for each of one or more of the operational components 640a-n. In some implementations, the robot control system 660 may perform one or more aspects of method 400 described herein.

As described herein, in some implementations all or aspects of the control commands generated by control system 660 in positioning an end effector to grasp an object may be based on control commands generated based on end effector pose(s), translational force measure(s), and/or other grasp parameters determined according to implementations disclosed herein. Although control system 660 is illustrated in FIG. 6 as an integral part of the robot 620, in some implementations, all or aspects of the control system 660 may be implemented in a component that is separate from, but in communication with, robot 620. For example, all or aspects of control system 660 may be implemented on one or more computing devices that are in wired and/or wireless communication with the robot 620, such as computing device 710.

Figure 7:
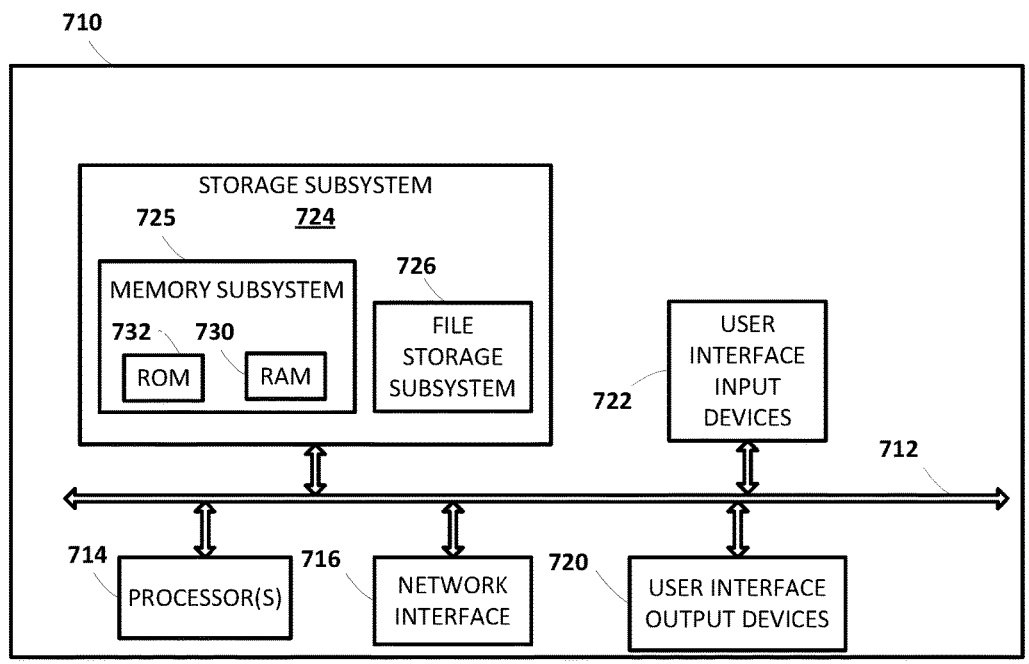
FIG. 7 schematically depicts an example architecture of a computer system.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the method of FIG. 4 and/or the method of FIG. 5.

These software modules are generally executed by processor 714 alone or in combination with other processors. Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method implemented by one or more processors, comprising:
    identifying an object model for an object in an environment of a robot, wherein the object model is a three-dimensional model of the object;
    determining an object model pose of the object model that conforms to an object pose of the object in the environment;
    identifying sensor data generated by one or more sensors of the robot during physical manipulation of the robot, the physical manipulation being by a user to cause a grasping end effector of the robot to perform at least part of a grasp sequence for grasping of the object in the environment;
    determining, based on the sensor data and the object model pose for the object model, one or more end effector poses of the grasping end effector, each of the end effector poses defining a pose of the grasping end effector relative to the object model during the grasp sequence;
    determining, based on the sensor data, at least one translational force measure indicating force applied by the robot to the object during at least some of the grasp sequence, the force being a result of translation of an entirety of the grasping end effector, and the translation of the entirety of the grasping end effector being a result of movement of one or more actuators that are upstream of the grasping end effector; and
    storing, in one or more computer readable media, an association of the object model to:
        the end effector poses defined relative to the object model, and
        the translational force measure.

2. The method of claim 1, wherein the end effector poses of the grasping end effector comprise at least a pre-grasp pose.

3. The method of claim 2, further comprising:
    receiving, at a first time, user interface input provided by the user to one or more user interface input devices associated with the robot;
    identifying, in response to receiving the user interface input at the first time, a pre-grasp pose group of the sensor data generated at or near the first time;
    wherein determining the pre-grasp pose is based on the pre-grasp pose group of the sensor data.

4. The method of claim 3, wherein the end effector poses of the grasping end effector further comprise at least one additional end effector pose determined based on an additional group of the sensor data generated after the first time.

5. The method of claim 2, wherein the sensor data comprises sensor data indicating position values for a plurality of actuators of the robot that dictate positioning of the grasping end effector and wherein determining the pre-grasp pose comprises:
    applying the position values at a given time to a forward kinematic model of the robot to generate a first pose of the grasping end effector at the given time; and
    converting the first pose to the pre-grasp pose based on the object model pose.

6. The method of claim 1, wherein the sensor data comprises sensor data indicating:
    position values for a plurality of actuators of the robot that dictate positioning of the grasping end effector, and
    at least one force value from a force torque sensor of the robot;
    wherein determining the end effector poses is based on the position values; and
    wherein determining the translational force measure is based on the force value.

7. The method of claim 1, wherein the sensor data comprises sensor data from at least one force torque sensor of the robot indicating a plurality of force values at a plurality of times, and wherein determining the translational force measure comprises determining the translational force measure based on a function of the plurality of force values.

8. The method of claim 1, wherein the sensor data comprises sensor data from at least one force torque sensor of the robot indicating at least one force value, wherein determining the translational force measure comprises determining the translational force measure based on the force value, and wherein the force torque sensor is responsive to force imparted by translation of the entirety of the grasping end effector independent of movement of any actuable members of the grasping end effector.

9. The method of claim 1, wherein the end effector poses comprise an ordered group of a plurality of end effector poses.

10. The method of claim 1, further comprising:
    receiving one or more user interface inputs provided by the user to one or more user interface input devices associated with the robot;
    wherein identifying the sensor data is based on conformance of the sensor data to the user interface inputs.

11. The method of claim 1, further comprising, subsequent to storing the association of the object model to the end effector poses and the force measure:

identifying vision sensor data generated by at least one
vision sensor of an additional robot in an additional
environment, the vision sensor having an additional
object in its field of view, and the additional robot
having an additional grasping end effector;
determining that the object model conforms to the additional object and determining an additional object
model pose of the object model that conforms to an
additional object pose of the additional object in the
environment;
identifying the end effector poses, defined relative to the
object model, based on the end effector poses being
associated with the object model;
converting the end effector poses, defined relative to the
object model, to target poses for the additional grasping
end effector, wherein the converting is based on the
determined additional object model pose that conforms
to the additional object pose of the additional object in
the environment;
determining control commands to provide to one or more
actuators of the additional robot to attempt a grasp of
the object, the control commands including commands
determined to cause the additional grasping end effector to achieve the target poses; and
providing the control commands to the one or more
actuators.

12. The method of claim 11, further comprising:
identifying the force measure based on the force measure
being associated with the object model;
wherein determining the control commands comprises
determining at least some of the control commands
based on the force measure.

13. The method of claim 1, wherein determining, based on the sensor data and the object model pose for the object model, the end effector poses defined relative to the object model comprises:
determining, based on the sensor data, initial end effector
poses of the grasping end effector relative to a reference
frame;
converting, based on the object model pose, the initial end
effector poses to the end effector poses that are defined
relative to the object model.

14. The method of claim 1, further comprising:
receiving, at a first time, user interface input provided by
the user to one or more user interface input devices
associated with the robot;
identifying, in response to receiving the user interface
input at the first time, a translational force measure
group of the sensor data generated following the first
time;
wherein determining the translational force measure utilizes the translational force measure group of the sensor
data based on the translational force measure group of
the sensor data being generated following the first time
that corresponds to the user interface input.

15. The method of claim 1, wherein determining the translational force measure is based on at least some of the sensor data that is generated in response to translation of the entirety of the grasping end effector independent of movement of any actuable members of the grasping end effector.

16. A method implemented by one or more processors, comprising:
identifying vision sensor data generated by at least one
vision sensor of a robot in an environment, the vision
sensor having an object in its field of view, and the
robot having a grasping end effector;
determining, based on the vision sensor data, an object
model that conforms to the object;
determining, based on the vision sensor data, an object
model pose of the object model, the object model pose
indicating the object pose of the object in the environment;
identifying a stored association of the object model to:
one or more end effector poses defined relative to the
object model, and
at least one force measure;
converting the end effector poses, defined relative to the
object model, to target poses for the grasping end
effector, wherein the converting is based on the determined object model pose that conforms to the additional object pose of the additional object in the environment;
determining, based on target poses, and the at least one
force measure: control commands to provide to one or
more actuators of the robot to attempt a grasp of the
object, the control commands including commands
determined to cause the grasping end effector to
achieve the target poses in the environment and to
cause the end effector to impart a force that is based on
the force measure, the force being imparted through
translation of an entirety of the grasping end effector as
a result of movement of one or more actuators that are
upstream of the grasping end effector; and
providing the control commands to the one or more
actuators.

17. The method of claim 16, wherein determining the commands to cause the end effector to impart the force that is based on the force measure comprises:
determining the commands so that the force strictly
conforms to an indicated force indicated by the force
measure.

18. The method of claim 16, wherein determining the commands to cause the end effector to impart the force that is based on the force measure comprises:
determining the commands so that the force does not
exceed an indicated force indicated by the force measure.

19. A system, comprising:
a vision sensor viewing an environment of a robot and
generating vision sensor data;
one or more processors associated with the robot, the one
or more processors configured to:
determine, based on the vision sensor data, an object
model for an object in an environment of a robot and an
object model pose of the object model that conforms to
an object pose of the object in the environment;
identify sensor data generated by one or more sensors of
the robot during physical manipulation of the robot, the
physical manipulation being by a user to cause a
grasping end effector of the robot to perform at least
part of a grasp sequence for grasping of the object in the
environment;
determine, based on the sensor data and the object model
pose for the object model, one or more end effector
poses of the grasping end effector, each of the end
effector poses defining a pose of the grasping end
effector relative to the object model during the grasp
sequence;
determining, based on the sensor data, at least one translational force measure indicating force applied by the
robot to the object during at least some of the grasp
sequence, the force being a result of translation of an
entirety of the grasping end effector, and the translation of the entirety of the grasping end effector being a result of movement of one or more actuators that are upstream of the grasping end effector; and store, in one or more computer readable media, an association of the object model to:
- the end effector poses defined relative to the object model, and
- the translational force measure.

* * * * *